(12) United States Patent
Andreica et al.

(10) Patent No.: US 11,031,007 B2
(45) Date of Patent: Jun. 8, 2021

(54) ORCHESTRATING EXECUTION OF A SERIES OF ACTIONS REQUESTED TO BE PERFORMED VIA AN AUTOMATED ASSISTANT

(71) Applicant: Google LLC, Mountain View, CA (US)

(72) Inventors: Mugurel Ionut Andreica, Adliswil (CH); Vladimir Vuskovic, Mountain View, CA (US); Joseph Lange, Zurich (CH); Sharon Stovezky, San Francisco, CA (US); Marcin Nowak-Przygodzki, Bäch (CH)

(73) Assignee: GOOGLE LLC, Mountain View, CA (US)

( * ) Notice: Subject to any disclaimer, the term of this patent is extended or adjusted under 35 U.S.C. 154(b) by 221 days.

(21) Appl. No.: 16/343,285

(22) PCT Filed: Feb. 7, 2019

(86) PCT No.: PCT/US2019/017039
§ 371 (c)(1),
(2) Date: Apr. 18, 2019

(87) PCT Pub. No.: WO2020/106315
PCT Pub. Date: May 28, 2020

(65) Prior Publication Data
US 2020/0302924 A1 Sep. 24, 2020

Related U.S. Application Data

(60) Provisional application No. 62/770,516, filed on Nov. 21, 2018.

(51) Int. Cl.
*G10L 15/22* (2006.01)
*G06N 3/08* (2006.01)
*G10L 15/02* (2006.01)

(52) U.S. Cl.
CPC ............ *G10L 15/22* (2013.01); *G06N 3/08* (2013.01); *G10L 15/02* (2013.01); *G10L 2015/223* (2013.01)

(58) Field of Classification Search
CPC ......... G10L 15/22; G10L 15/00; G10L 15/01; G10L 15/08; G10L 15/183; G10L 15/20;
(Continued)

(56) References Cited

U.S. PATENT DOCUMENTS 10,896,675 B1 * 1/2021 Lam ..................... B25J 13/003
2013/0275164 A1 10/2013 Gruber et al.
(Continued)

OTHER PUBLICATIONS

European Patent Office: Examination Report issued for Application No. 19706214.4 dated Oct. 14, 2020.
(Continued)

*Primary Examiner* — Qi Han
(74) *Attorney, Agent, or Firm* — Middleton Reutlinger

(57) ABSTRACT

Implementations are set forth herein for creating an order of execution for actions that were requested by a user, via a spoken utterance to an automated assistant. The order of execution for the requested actions can be based on how each requested action can, or is predicted to, affect other requested actions. In some implementations, an order of execution for a series of actions can be determined based on an output of a machine learning model, such as a model that has been trained according to supervised learning. A particular order of execution can be selected to mitigate waste of processing, memory, and network resources—at least relative to other possible orders of execution. Using interaction data that characterizes past performances of automated assistants, certain orders of execution can be adapted over time, thereby allowing the automated assistant to learn from past interactions with one or more users.

14 Claims, 6 Drawing Sheets

(58) Field of Classification Search
CPC . G10L 15/26; G10L 2015/22; G10L 2015/00; G10L 2015/06; G10L 2015/08; G10L 2015/223; G10L 2015/226; G10L 2015/228
USPC ............. 704/254, 231, 255, 270, 270.1, 275
See application file for complete search history.

(56) References Cited

U.S. PATENT DOCUMENTS

| | | |
|---|---|---|
| 2014/0074483 A1 | 3/2014 | van Os |
| 2017/0069315 A1 | 3/2017 | Chung et al. |
| 2018/0122376 A1* | 5/2018 | Kojima ................... G10L 15/22 |
| 2019/0034157 A1* | 1/2019 | Steinberg ............... G06Q 10/10 |
| 2019/0035390 A1* | 1/2019 | Howard .................. G10L 15/30 |

OTHER PUBLICATIONS

European Patent Office; International Search Report and Written Opinion of Ser. No. PCT/US2019/017039; 13 pages; dated Jul. 30, 2019.
European Patent Office; Communication Pursuant to Article 94(3) for European Application No. 19706214.4; dated Apr. 6, 2020.
European Patent Office; Communication under Rule 71(3) EPC issued in Application No. 19706214.4; 49 pages; dated Mar. 5, 2021.

* cited by examiner

ORCHESTRATING EXECUTION OF A SERIES OF ACTIONS REQUESTED TO BE PERFORMED VIA AN AUTOMATED ASSISTANT

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e. utterances), which may in some cases be converted into text and then processed, and/or by providing textual (e.g., typed) natural language input. An automated assistant responds to a request by providing responsive user interface output, which can include audible and/or visual user interface output.

In many cases, an automated assistant may exclusively execute actions according to an order that the user set forth when specifying the requested actions. This can prove problematic, particularly when the user provides a single natural language input that includes a request for multiple different actions to be performed. For instance, the user can set forth a request for a series of actions to be performed, in an order that the user may not have considered fully before speaking the request. As a result, certain actions that might otherwise be performed relatively quickly may be delayed inadvertently, thereby introducing latency and other computational inefficiencies into certain performance aspects of the automated assistant.

As an example, if the user requests a media stream to be provided and a web search to be performed, the automated assistant may consequently prioritize providing the media stream, thereby delaying performance of the web query—which can otherwise be performed relatively quickly in many instances. Should the user forget about the web query while the continuous media playback is being provided, the user may subsequently reissue the same request, thereby wasting computational resources on processing the duplicative request. Furthermore, when the automated assistant exclusively relies on the user to indicate an order for the sequence of actions to be performed, certain processes, such as downloading, caching, and/or rendering data, may not be sequentially arranged for execution in an optimal way.

SUMMARY

Described herein are implementations related to systems, methods, and apparatuses for creating an order of execution for multiple requested automated assistant actions. Specifically, the actions can be requested by a user via a single spoken utterance, and the order of execution for the actions can be arranged according to how each requested action can, or is predicted to, affect another requested action. For instance, a spoken utterance can include a request for multiple actions to be performed, and at least one action of the multiple actions can correspond to a dialogue-initiating query. If the dialogue-initiating query was to be prioritized ahead of the other multiple actions, performance of the other actions would be postponed until the dialogue between the user and the automated assistant was completed. Therefore, in order to mitigate delay times between a request and performance of an action, the dialogue-initiating query can be assigned as the last action to be completed of the multiple requested actions. A user can consequently submit commands to a device or system that are then interpreted for more efficient performance. That is, the user need not reconcile the most efficient form of command input with most efficient form of command performance since the order of execution can be determined by the system, method or apparatus. Accordingly the ease and efficiency of interaction is increased.

As an example, the user can provide a spoken utterance such as, "Assistant, set an alarm for tomorrow and also could you tell me the weather for tomorrow?" The automated assistant can receive the spoken utterance and determine that the spoken utterance includes a first request for setting an alarm and a second request for providing a weather report. Furthermore, the automated assistant can determine that setting the alarm requires supplemental information to be provided by the user, and, therefore, further dialogue to be processed. For instance, the automated assistant may have to generate a natural language output that includes a request for a time for the alarm, and the automated assistant may have to process a subsequent input from the user that identifies the time for the alarm. Additionally, the automated assistant can determine that providing the weather report requires submitting a request over the internet, receiving weather data in response, and converting the weather data to a natural language output for the user. Therefore, at least based on the first request necessitating further information from the user and the second request not necessitating any further dialogue with the user, the automated assistant can order the execution of the actions by fulfilling the second request before fulfilling the first request. In other words, the user will receive the weather report before participating in a dialogue session for setting up the alarm, at least based on the setting up of the alarm requiring further information from the user.

In some implementations, actions requested to be performed by a user can be arranged according to whether one or more of the requested actions result in a lasting output, or are predicted to result in a lasting output relative to the other requested actions. In other words, actions to be performed at the request of the user can be arranged according to whether one or more of the requested actions would result in an output from a particular modality that would interfere with performance of one or more of the other requested actions. For example, the user can provide a spoken utterance such as, "Assistant, play my morning playlist and tell me the weather." In response to the automated assistant receiving the spoken utterance, the automated assistant can identify a first requested action of playing the morning playlist and a second requested action of providing the user with a weather report. Furthermore, the automated assistant can determine that providing the weather report would result in an audible weather report being provided for a first period of time, and that playing the morning playlist would result in audible music being provided for a second period of time. Additionally, the automated assistant can determine that the second period of time is greater than the first period of time, therefore, the automated assistant can order the execution of actions such that the second requested action is performed before the first requested action. In other words, because providing the weather report to the user would take less time than providing the morning playlist, the automated assistant can prioritize the weather report over playing the music of the morning playlist. In this way, prioritization of the actions can be based on whether an estimated amount of time of performance of one particular action extends beyond that of another particular action.

In some implementations, when the user provides a spoken utterance that includes a request to playback multiple media items, the order of actions for playing back the media items can be arranged according to an order specified in the spoken utterance. For instance, when the user provides a spoken utterance, such as, "Assistant, play the songs 'For Once in My Life' and "I Was Made to Love Her." In response, the automated assistant can play each of the two songs in the order that the user specified, whether or not the user intentionally specified the order or not. However, in some implementations, the user can explicitly specify that one or more actions be performed after playback of one or more media items. For instance, the user can provide a spoken utterance such as, "Assistant, play the song 'Superstition' and then remind me to set up the security alarm." In response, because the user specified particular conditions for performance of the actions, the automated assistant can receive this spoken utterance and cause playback of the specified media item followed by providing a reminder to the user to set up their security alarm.

In some implementations, when the user provides a spoken utterance that includes a first action of scheduling a particular task or event, and a second action that at least partially depends on a result of the first action being completed, the automated assistant can delay the second action until the first action is completed. For instance, the user can provide a spoken utterance such as, "Assistant, book me a ticket for a movie this Friday, and then book a table at a restaurant after the movie." In response to receiving the spoken utterance, the automated assistant can determine parameters necessary to complete each action. For instance, in order to book a movie ticket, the automated assistant needs to determine play times for the movie at the specified date. Furthermore, in order to book a table at the restaurant, the automated assistant needs a parameter for a time for booking the reservation at the restaurant. However, in order to mitigate an amount of dialogue exchanged, and to preserve computational and/or network resources, the automated assistant can determine an estimated reservation time for the restaurant based on: a time of the movie, a length of the movie, a distance of a movie theater to the restaurant, and/or any other factors that can influence when a reservation at a restaurant should be booked for.

In some implementations, the user can provide a spoken utterance that includes commanding the automated assistant to open a particular application and perform a particular action using the application. However, the user may provide the spoken utterance in a way that is agnostic relative to the application that will perform the action. For instance, the user can provide a spoken utterance such as, "Assistant open my auction application and tell me how much a box of avocado seeds are." In response, the automated assistant can determine that the action of opening the auction application and providing a price of certain goods are associated with each other. In some implementations, the automated assistant can quantify a correlation between both requests. When the quantified correlation satisfies a particular threshold, the automated assistant can attempt to use the application identified by the user to perform another action requested by the user. In this way, not only would the order of execution be determined by the automated assistant—assuming that the application would need to be opened before performing action, but also the ambiguity regarding the application to be used to perform the action can be resolved by the automated assistant.

In some implementations, reordering of execution of requested actions can be learned over time. For instance, in some implementations, feedback from the user can be used to learn whether the automated assistant ordered performance of certain requested actions accurately or inaccurately. For example, when the user provides a spoken utterance that includes a request for performing multiple actions, and the automated assistant begins performance of an action that the user did not intend to be prioritized over other, the user can provide an indication that performance of the actions has been initialized incorrectly. The user can interrupt the performance of the actions by providing an input to a display panel for interrupting actions being performed by the automated assistant, and/or provide a spoken utterance such as, "stop," for stopping an ongoing performance of the actions. Thereafter, such feedback or input can be relied upon to correct an ordering of the actions when they are again requested by the user.

In some implementations, historical interaction data that characterize interactions between the user and the automated assistant can be analyzed to determine particular actions that resulted in requests for additional input from the user. In this way, the automated assistant can identify actions that typically resulted in further interaction and those that did not. Thereafter, when the user provides a spoken utterance for requesting that certain actions be performed, the automated assistant can prioritize or not prioritize those particular actions that resulted in additional input being requested from the user.

In some implementations, historical interaction data that characterize interactions between various users and their respective automated assistants can be used to determine an ordering of actions to be performed in response to a spoken utterance. For example, a user can provide a spoken utterance such as, "Assistant, play my morning playlist and tell me the weather." In response, the automated assistant can access, or otherwise be trained based on, historical interaction data that characterize previous instances when one or more users requested those particular actions. Specifically, the automated assistant can determine that users more often request a weather report before requesting music in the morning. Therefore, in response to receiving the spoken utterance from the user, the automated assistant can re-order the actions requested, such that the weather report is provided before the morning playlist. In some implementations, the historical interaction data can indicate, or otherwise characterize, instances in which users requested both actions in a single spoken utterance and/or requested both actions in separate spoken utterances and/or at separate times (but optionally within a threshold time of one another), but none-the-less requested both actions be performed more frequently in a particular order. The automated assistant can therefore identify the most frequently performed order of execution for the actions, and re-order the performance of any requested actions accordingly.

In some implementations, when a user provides a spoken utterance that includes a request for multiple actions to be performed, and one action corresponds to a request for a personal message, the personal message can be delayed until any other actions are completed. For instance, when the user provides a spoken utterance such as, "Talk to you tomorrow, and please set an alarm for 8 A.M. tomorrow," the automated assistant can receive this spoken utterance, and determine that the spoken utterance includes a request for a personal message and a request for an alarm to be configured. In response, the automated assistant can prioritize setting up the alarm over providing the personal message. Therefore, when the automated assistant responds to the spoken utterance, the automated assistant can cause a natural language output to be provided, such as, "Ok, I set the alarm. Good night, Jim." In this way, actions having higher utility can be prioritized over actions that may not otherwise affect a schedule of the user, an environment of the user, a device accessible to the user, and/or any other feature associated with the user.

In some implementations, a method implemented by one or more processors is set forth as including operations such as receiving audio data that that characterizes a spoken utterance from a user, wherein the spoken utterance includes a request for multiple actions to be performed via an automated assistant and the spoken utterance is received at an automated assistant interface of a computing device. The operations can further include identifying, based on the audio data characterizing the spoken utterance, each action of the multiple actions requested by the user to be performed via the automated assistant, wherein requests for the multiple actions to be performed are set forth in the spoken utterance according to a first order of actions. The operations can further include determining, based on identifying each action of the multiple actions, an execution characteristic of each action of the multiple actions, wherein a particular execution characteristic of an action of the multiple actions affects a temporal aspect of execution of the multiple actions when the multiple actions are executed according to the first order of actions by one or more computing devices, and wherein determining the execution characteristic of each action of the multiple actions includes accessing data that is generated based on past executions of one or more actions of the multiple actions at the computing device and/or a separate computing device. The operations can further include determining, based on the particular execution characteristic of the action of the multiple actions, a second order of actions for executing the multiple actions, wherein the second order of actions, when executed by the one or more computing devices, causes the one or more computing devices to exhibit a different the temporal aspect of execution of the multiple actions. The operations can further include causing, based on determining the second order of actions, the automated assistant to initialize performance of one or more actions of the multiple actions according to the second order of actions.

In some implementations, determining the second order of actions includes: processing output data from a trained neural network model, the trained neural network model having been trained using historical interaction data that characterizes at least one or more previous interactions between the user and the automated assistant. In some implementations, the historical interaction data further characterizes multiple interactions involving other users that have previously interacted with the automated assistant in furtherance of causing the automated assistant to perform various sequences of actions. In some implementations, the historical interaction data further characterizes feedback provided by the user to the automated assistant in order to influence an order of execution of previously requested actions. In some implementations, the particular execution characteristic of the action of the multiple actions characterizes the action as a dialog initiating action, and a supplemental dialog session between the user and the automated assistant is to occur for the user to identify a value to be assigned to a parameter of the action.

In some implementations, the temporal aspect of the execution of the multiple actions, according to the first order of actions, includes at least an estimated time of execution for one or more actions of the multiple actions, and the method further comprises: determining that the supplemental dialog session is predicted to extend the estimated time of execution for the one or more actions when the multiple actions are executed according to the first order of actions. In some implementations, another action of the multiple actions includes providing continuous media playback, and the second order of the actions prioritizes the dialog initiating action over the other action that includes providing the continuous media playback. In some implementations, causing the automated assistant to initialize performance of the at least one action of the multiple actions according to the second order of actions includes: generating a natural language output that provides the user with an indication that the at least one action of the multiple actions has been initialized according to the second order of actions.

In other implementations, a method implemented by one or more processors is set forth as including operations such as processing audio data that that characterizes a spoken utterance from a user requesting that an automated assistant perform multiple actions, wherein the multiple actions are characterized by the user in the spoken utterance according a first order of actions. The method can further include determining, based on processing the audio data, an action classification for each action of the multiple actions requested by the user, wherein a particular action classification of a particular action of the multiple actions includes a dialog initiating action that is executed according to at least one parameter. The method can further include determining whether a value for the at least one parameter is specified by the user in the spoken utterance. The method can further include, when the value for the at least one parameter was unspecified in the spoken utterance: generating a second order of actions for the multiple actions, wherein the second order of actions causes the dialog initiating action to have a reduced priority relative to another action of the multiple actions based on the value for at least one parameter being unspecified in the spoken utterance.

The method can further include, when the at least one parameter is specified in the spoken utterance: generating a third order of actions for the multiple actions, wherein the third order of actions causes the dialog initiating action to have priority that is unaffected by the user specifying the value for at least one parameter in the spoken utterance. The method can further include, determining the action classification includes determining, each action of the multiple actions, whether the action corresponds to a continuous playback of media, and the method further comprises: when a requested action of the multiple actions includes a continuous playback of media action: generating the second order of actions or the third order of actions to prioritize the requested action such that the requested action is executed later in time relative to the other action of the multiple actions. The method can further include determining whether the user explicitly specified a temporal condition for executing at least one action of the multiple actions; and when the user has explicitly specified the temporal condition for executing the at least one action of the multiple actions: generating the second order of actions or the third order of actions to comply with the temporal condition for executing at least one action of the multiple actions. The method can further include wherein the automated assistant is configured to override the second order of actions or the third order of actions according to the temporal condition when the particular action is the at least one action explicitly requested by the user to be affected by the temporal condition.

In yet other implementations, a method implemented by one or more processors is set forth as including operations such as determining that a user has provided a spoken utterance that includes requests for an automated assistant to perform multiple actions that include a first type of action and a second type of action, wherein the automated assistant is accessible to the user via an automated assistant interface of a computing device. The method can further include generating, in response to the user providing the spoken utterance, an estimated delay for the first type of action when the second type of action is prioritized over the first type of action during execution of the multiple actions. The method can further include determining, based on the estimated delay, whether the estimated delay for the first type of action satisfies a threshold, wherein, when the estimated delay for the first type of action satisfies the threshold, execution of the first type of action is prioritized over the second type of action. The method can further include generating, based on whether the estimated delay satisfies the threshold, a preferred order of execution for the multiple actions requested by the user. The method can further include causing the automated assistant to initialize performance of the multiple actions according to the preferred order of execution.

In some implementations, the method can further include determining an action classification for each action of the multiple actions requested by the user, wherein the automated assistant is configured to prioritize at least one particular classification of actions over at least one other classification of actions. In some implementations, the first type of action includes a dialog initiating action and the second type of action includes a media playback action. In some implementations, the media playback action is configured to be at least partially performed at a separate computing device, and the method further comprises: when the dialog initiating action is prioritized over the media playback action: causing the dialogue initiating action to be initialized at the computing device simultaneous to causing the separate device to initialize an application for executing the media playback action. In some implementations, the method can further include, when the media playback action is prioritized over the dialog initiating action: causing the automated assistant to provide a natural language output corresponding to dialogue in furtherance of completing the dialog initiating action, and when the dialogue initiating action is completed: causing the automated assistant to initialize performance of the media playback action at the computing device or the separate computing device.

In some implementations, the dialog initiating action, when executed, includes initializing a dialog session between the user and the automated assistant in order for the user to identify a value to be assigned to a parameter in furtherance of completing the dialog initiating action. In some implementations, the media playback action, when executed, includes initializing playback of media that is accessible via one or more files, and the estimated delay is based on a total of file lengths for the one or more files. In some implementations, the media playback action, when executed, includes initializing playback of media that is accessible via one or more network sources, and the estimated delay is based on time data that is accessible via the one or more network sources.

Other implementations may include a non-transitory computer readable storage medium storing instructions executable by one or more processors (e.g., central processing unit(s) (CPU(s)), graphics processing unit(s) (GPU(s)), and/ or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
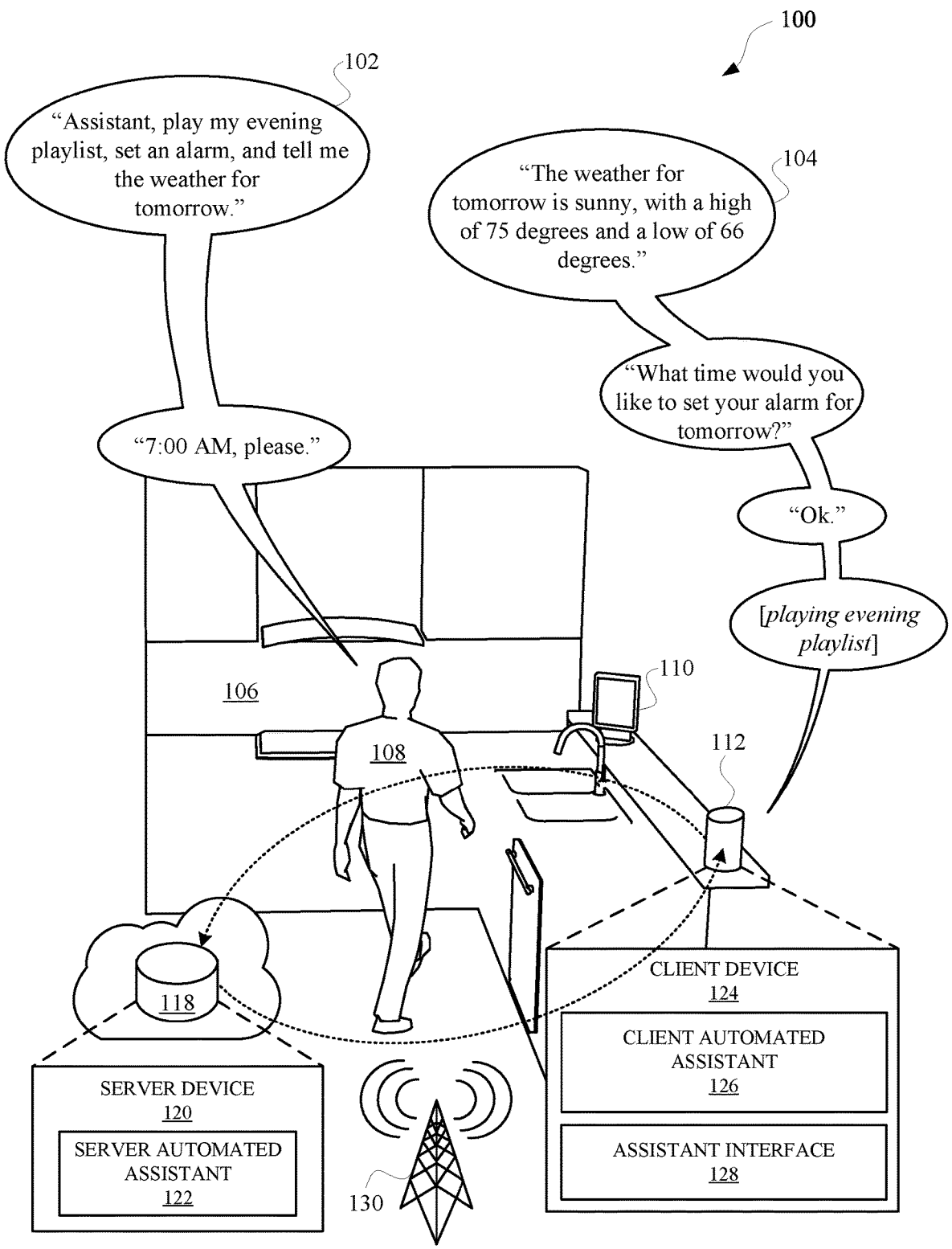
FIG. 1 illustrates a view of a user invoking an automated assistant using a spoken utterance in order to cause the automated assistant to perform a series of actions.

FIG. 1 illustrates a view 100 of a user 108 invoking an automated assistant using a spoken utterance 102 in order to cause the automated assistant to perform a series of actions. Specifically, the view 100 provides an illustration of how the automated assistant can modify an order of a requested series of actions in order to provide a more efficient use of computational resources. For example, the user 108 can be located within an area 106 of their home, which can include a client device 124 and another device 110. Each device of the client device 124 and the other device 110 can provide access to an automated assistant. For instance, the client device 124 can provide access to a client automated assistant 126 via one or more assistant interfaces 128. An assistant interface 128 can be one or more devices, or groups of devices, capable of receiving inputs from the user 108 and/or providing outputs to the user 108. For instance, an assistant interface 128 can include one or more microphones and one or more audio speakers. Alternatively, or additionally, an assistant interface 128 can include one or more touch display panels and/or one or more cameras. Inputs and outputs can be generated for the client automated assistant 126 at the client device 124 and/or a remote computing device 118, such as a server device 120. The server device 120 can include a server automated assistant 122, which can provide support for input and output processing, as discussed herein.

When the user 108 provides a spoken utterance 102 that includes a spoken utterance for the automated assistant (i.e., the client automated assistant 126 and/or the server automated assistant 122) to perform multiple different actions, the client automated assistant 126 can receive the spoken utterance 102 and determine an order for the multiple different actions. For instance, the spoken utterance 102 can be, "Assistant, play my evening playlist, set an alarm, and tell me the weather for tomorrow." The spoken utterance 102 can describe the requested actions in a first order, which sets forth playing the evening playlist first, then setting the alarm, and then providing a weather report. However, in response to receiving the spoken utterance 102, the automated assistant can determine a different order, should another order of execution be more efficient or otherwise more suitable for the user 108.

The client automated assistant 126 and/or client device 124 can convert the spoken utterance 102 into audio data that can be transmitted from the client device 124 to the server device 120 via a network 130 (e.g., the internet). The server device 120 and/or the server automated assistant 122 can convert the audio data into textual data, and then parse the textual data to identify the actions requested by the user 108, as discussed herein. In some implementations, identifiers for the actions can be processed using a trained machine learning model, to generate output that indicates a second order of execution for the actions. In other implementations, classifications for the requested actions can be identified, and based on the classifications of actions requested by the user, a second order of execution for the actions can be generated.

Additionally, or alternatively, contextual data associated with the user 108, the area 106, and/or any other features that can be associated with the user 108, can also be processed when determining the second order of execution for the actions. For instance, the contextual data can indicate that the user 108 is located within an area 106 that includes the client device 124, such as a standalone speaker device 112, and another device 110, such as a touch display device. Therefore, in response to receiving the spoken utterance 102 and accessing the contextual data, the automated assistant can determine an order of actions to be performed by the client device 124 and an order of actions to be performed by the other device 110. For instance, the automated assistant can cause the client device 124 to be assigned the actions of setting the alarm and playing the evening playlist. Furthermore, the automated assistant can cause the other device 110 to be assigned the action of providing the weather report for tomorrow. Specifically, the automated assistant can cause the weather report to be displayed at the display panel of the other device 110, thereby mitigating interruptions to the dialogue session, that would occur between the user 108 and the automated assistant, for setting up the alarm.

In some implementations, identifiers for the actions requested in the spoken utterance 102 can be processed using the machine learning model, along with other data that is associated with the actions. For instance, the other data can include a type of device that is receiving the spoken utterance 102, a time of day that the spoken utterance 102 was received, an identifier for the user 108 that provided the spoken utterance 102, a total amount of execution time or estimated amount of execution time per action of the requested actions, and/or any other data that can be suitable for characterizing a feature of a requested action. Based on the processed one or more inputs, the machine learning model can be utilized to generate an output characterizing an order for execution of the requested actions. The output generated using the machine learning model can be shared with the client device 124 and/or the other device 110.

In response to receiving an order of execution generated by the server device 120, and/or otherwise generated in response to receiving the spoken utterance 102, the client device 124 can initialize performance of the actions. For instance, the client automated assistant 126 can provide a natural language output 104 in furtherance of completing the actions. As indicated in FIG. 1, the request for a weather report can be prioritized over setting an alarm, and setting the alarm can be prioritized over playing the evening playlist. Therefore, the aforementioned order of actions can cause the natural language output 104 to initially incorporate a weather report. Specifically, the natural language output 104 can include a weather report such as, "The weather for tomorrow is sunny, with a high of 75 degrees and a low of 66 degrees." Upon completion of the first action (e.g., the weather report), the client automated assistant 126 can initialize performance of the second action (e.g., setting alarm for the following day). When performing the second action, the client automated assistant 126 can initialize a dialogue session with the user 108 by providing a natural language output such as, "What time would you like to set your alarm for tomorrow?" and response, the user 108 can provide a spoken utterance 102 such as, "7:00 A.M., please."

The client automated assistant 126 can, in response, provide an acknowledgement of the spoken utterance 102 by providing a natural language output 104 such as, "Ok." Thereafter, and in response to completing the second action, the client automated assistant 126 can initialize performance of the third action in the second order of actions. Specifically, the client automated assistant 126 can initialize playback of an evening playlist, which can be a list of songs set by the user 108 to be preferably played during an evening. Therefore, despite the user 108 providing a request for actions to be performed according to a first order of execution, the automated assistant can rearrange the order of execution in order to ensure that execution time for each action is minimized. For instance, should the evening playlist have been executed first, setting the alarm and providing the weather report would have been delayed until the end of the playlist was reached. Furthermore, if playback of the playlist would have extended into the following day, the request for the weather for "tomorrow" would have been performed the following day, thereby changing the targeted day of the weather report to a subsequent day. This change to the targeted day would have amounted to a waste of computational resources, especially if the user had to provide another spoken utterance in order to specify, again, the exact day that the weather report should correspond to.

Figure 2:
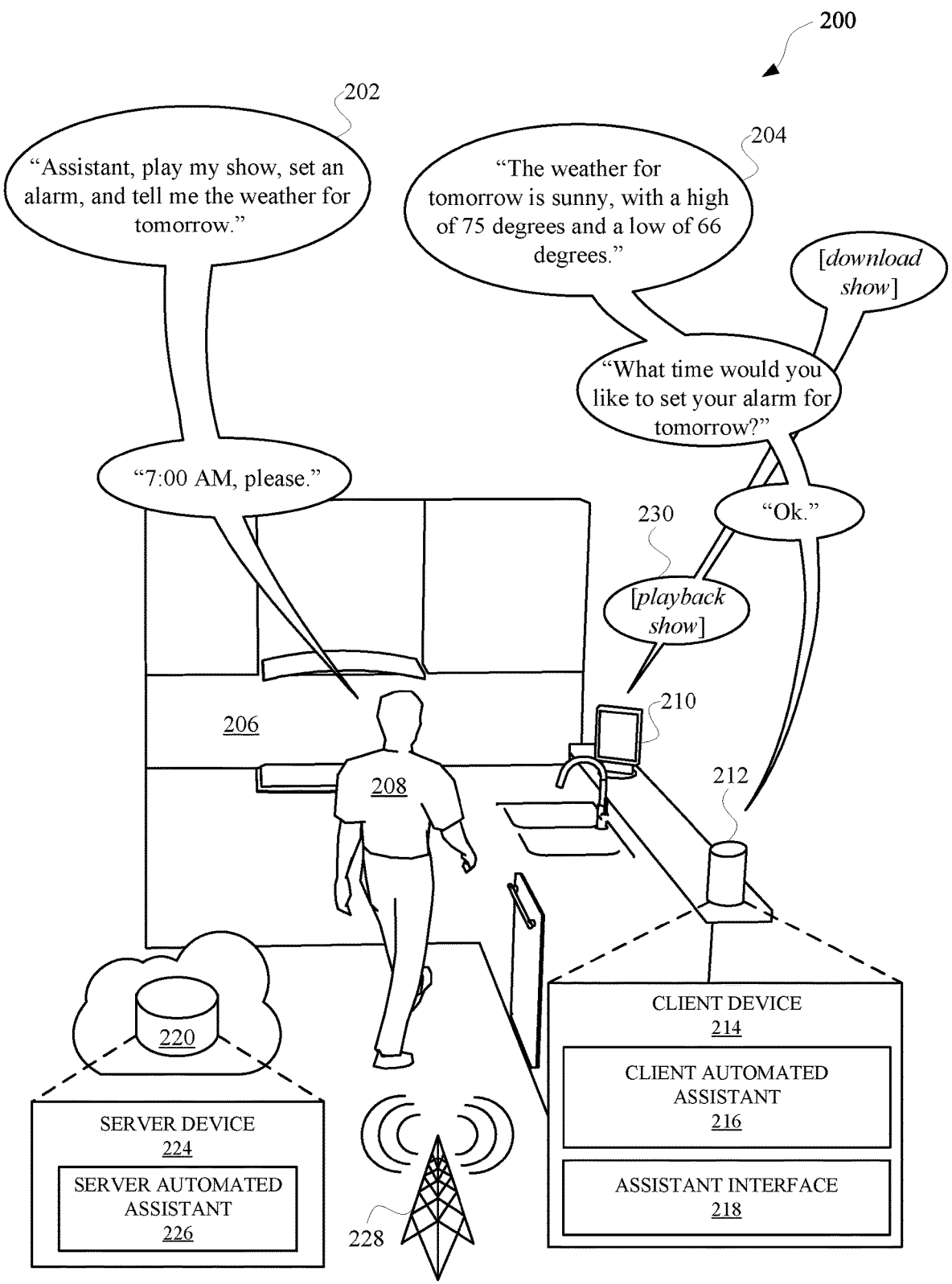
FIG. 2 illustrates a view of a user invoking an automated assistant to perform multiple different actions, and causing the automated assistant to rearrange the order of the actions.

FIG. 2 illustrates a view 200 of a user 208 invoking an automated assistant to perform multiple different actions, and causing the automated assistant to rearrange the order of the actions. For instance, the user 208 can provide a spoken utterance 202 such as, "Assistant, play my show, set an alarm, and tell me the weather for tomorrow." The request to "play my show" can correspond to a continuous media playback action, which can involve one or more subtasks, such as downloading and caching portions of the media, and subsequently initializing playback of the downloaded media. Furthermore, the request to "set an alarm" can include one or more subtasks such as generating a natural language output, processing a subsequent natural language input from the user, and setting the alarm based on content of the natural language input from the user.

In various implementations, in order to preserve computational resources and eliminate latency when performing the multiple different actions, the order for the actions, and corresponding subtasks, can be determined utilizing a machine learning model, and/or one or more modules capable of determining an order of execution for particular actions. In some implementations, the machine learning model can be trained using supervised learning. In some of those implementations, positive training examples are utilized that include, as training example input: data identifying the automated assistant actions in a request and optionally one or more contextual values. The data identifying the automated assistant actions can include, for example, an intent and optionally parameter(s) for the action. For example, for an action of streaming "show X" on a smart television, the intent can be "stream media," and the parameters can include a type of media (e.g., a television show type), a duration of the media (e.g., 30 minutes), and/or a target device for receiving the stream. The one or more contextual values can include, for example, a device via which the request was received, a time of the day, a day of the week, etc. The training example inputs can optionally be of a fixed dimension that is dictated by a maximum number of actions for which the machine learning model is being trained, and can include "null" values in training examples that have less than the maximum number of actions. For example, the maximum number of actions can be five, and for a training example input that includes three actions in a request, data identifying each of the three actions can be included in the training example input, and null data can be provided for the remaining two actions.

The positive training examples can further include, as training example output: data identifying a particular order for the actions identified in the training example input. The particular order is a preferred order, which can be determined as the preferred order utilizing various techniques. For example, a particular order of "Action3, Action1, Action2" for a training example output of a positive training example can be based on human labeling (e.g., an explicit labeling of the order "Action3, Action1, Action 2"), past occurrences of users explicitly specifying the preferred order in a single request (e.g., "Assistant, first perform Action3, then Action1, and then Action 2"), and/or past occurrences of users specifying the preferred order in separate requests that are temporally proximal to one another (e.g., "Assistant, perform Action3", followed within one minute by "Assistant, perform Action1", and followed within one minute by "Assistant Action 2"). Also, for example, a particular order of "Action3, Action1, Action2" for a training example output of a positive training example can be based on past occurrences of performing the actions in the particular order being more computationally efficient than performing the actions in any alternative particular order. For example the particular order of "Action3, Action1, Action2" can be selected based on past occurrences of the particular order taking on average 33.5 seconds to complete, whereas past occurrences for all alternative particular orders each take greater than 34.0 seconds on average to complete. The shorter average completion time for the particular order can be due to, for example, a prompt for one of the actions being presented at a time that results in quicker user response to the prompt, Action1 and/or Action2 being associated with a lagging and/or relatively slow server and being preemptively fetchable/executable in the particular order (since they are not first), etc.

The training example outputs can optionally be of a fixed dimension that is determined by, or based on, a maximum number of actions for which the machine learning model is being trained, and can include "null" values in training examples that have less than the maximum number of actions. For example, the maximum number of actions can be five, and for a training example input that includes three actions in a request, data identifying the order of the three actions can be included in the training example output, and null data can be provided for the remaining two actions. As one particular example, the training example outputs can be a vector of twenty-five values, with each sequential group of five indicating the placement of a corresponding one of the actions in the particular order. For instance, assuming a provided order, in the training example input of "Action1, Action2, Action3", and a particular order of "Action3, Action1, Action2" the following training example output can indicate that particular order: [0, 1, 0, 0, 0, | 0, 0, 1, 0, 0, | 1, 0, 0, 0, 0, | null, . . . null, | null, . . . null]. In the preceding example, each "1" indicates a break between the dictated placement corresponding to each action, the first "1" indicates that "Action1" should be $2^{nd}$ (since it's the second placement in the five options for "Action1"), the second "1" indicates that "Action2" should be $3^{rd}$ (since it's the third placement in the five options for "Action2"), the third "1" indicates that "Action3" should be $1^{st}$ (since it's the first placement in the five options for "Action3"), and the "nulls" indicate that there are no fourth and fifth actions in the training example input.

The machine learning model can be trained utilizing the supervised training examples. After training, the machine learning model can be utilized to predict a particular order for execution of a plurality of actions of a request, based on identifiers of those actions and optionally based on contextual value(s). Use of such a machine learning model can provide quick resolution of a particular order at run time, and can generalize combinations of actions and/or contextual values that may not have appeared in training data. Accordingly, such a machine learning model is robust to newly added actions and/or newly presented combinations of actions. Further, such a machine learning model can, once trained, consume less space than large mappings between various actions and preferred orders and can be more computationally efficient to utilize than searching such large mappings.

In some implementations, training data for the machine learning model, such as a supervised learning model, can include input data identifying actions capable of being performed via the automated assistant. Additionally, the training data for the supervised learning model can include data characterizing total time for execution of each action of those actions identified in the input data. Alternatively, or additionally, the training data for the supervised learning model can include data characterizing latency time and/or estimated latency time of each action of those actions requested by the user. Alternatively, or additionally, the training data for the supervised learning model can include data characterizing a total amount of time or estimated total amount of time for all the actions, in a set of requested actions, to be executed. In this way, a function and/or model generated according to the supervised learning can effectively exhibit a correlation between the actions requested to be performed via the automated assistant and one or more temporal aspects of each action, or all of the actions.

An action performed via an automated assistant can have one or more execution characteristics, and an execution characteristic of an action can affect one or more temporal aspects of the action and/or multiple actions (e.g., a series of actions requested by a user to be performed via an automated assistant). For instance, an execution characteristic can characterize one or more operations to be performed during the execution of an action. As an example, a request for an automated assistant to perform an action of setting an alarm can cause the automated assistant to perform an operation of initializing a dialog session with a user, and the dialog session can be an execution characteristic of the action of setting the alarm. Specifically, the dialog session can be initialized in order to provide the user with an opportunity to specify a time for the alarm to go off. Therefore, because the action has an execution characteristic of initializing a dialog session, which would take some amount of time to complete, a temporal aspect (e.g., total time to complete the action) of the action can be affected. A variety of temporal aspects of the action can be affected, such as, but not limited to, a total estimated time for execution of the action, an estimated amount of time for the user to be provide input for completing the action, an estimated amount of latency between a request and initialization of the action, and/or an amount of latency between initializing the action via a request to a third party and receiving a response from the third party.

A temporal aspect of an action and/or series of actions can include one or more time-related properties exhibited by one or more computing devices before, during, and/or after performance of an action and/or series of actions by the one or more computing devices. Additionally, or alternatively, a temporal aspect of an action and/or a series of actions can be any quantifiable value of time characterizing a particular operation and/or portion of the action and/or series of actions. For instance, a request for an automated assistant to perform series of actions such as, "Assistant, turn on my lights and play my podcast," can have a quantifiable amount of latency between actually turning on the lights and playing the podcast, and/or a quantifiable amount of time for completion of the actions. Furthermore, the quantifiable amount of latency, and/or any other temporal aspect, can be different depending on an order in which the actions are performed. For instance, a delay between the user providing the request and the automated assistant turning on the lights can be greater when the "play my podcast" action is initialized before the action of "turning on the lights" is initialized, at least relative to another order of actions when the action of "turning on the lights" is initialized before the action of "play my podcast" is initialized.

In some implementations, a trained machine learning model can be used to estimate temporal aspects of a sequence of requested actions. For instance, identifiers for a first action, a second action, and a third action can be provided as input to the machine learning model, along with an indication of an order of execution for the actions. In response to receiving the input, the machine learning model can provide an output that indicates one or more temporal aspects of the provided order of execution for the actions. The application or module tasked with providing an efficient order of execution for the actions can rearrange the sequence of actions, and provide a different order for the actions as input to the machine learning model. In response to receiving input corresponding to the different order for the actions, the machine learning model can provide another indication of one or more other temporal aspects of the different order for the sequence of actions. This process of estimating temporal aspects of various sequences of the actions can be repeated for all, or at least multiple, variations of orders of execution for the actions. Each respective output from the machine learning model for each respective variation of the order of execution can be compared in order to determine the execution order that provides the most efficient use of computational resources and/or mitigates any negative features of the corresponding temporal aspects. For instance, when the output of the machine learning model indicates a total expected amount of latency during execution of the actions, a variation of the order of actions corresponding to the least expected amount of latency can be selected and provided to the automated assistant for execution. Alternatively, or additionally, when the output of the machine learning model indicates a total estimated execution time for the sequence of actions, a variation of the order of actions corresponding to the shortest total estimated execution time for the sequence of actions can be selected and provided to the automated assistant for execution.

For example, as illustrated in FIG. 2, the user 208 can provide a spoken utterance 202 such as, "Assistant, play my show, set an alarm, and tell me the weather for tomorrow." The spoken utterance 202 can be received by a client device 214, such as a stand-alone speaker device 212. The spoken utterance 202 can be converted into audio data by the client device 214, and transmitted over a network 228 (e.g., the internet), to a remote computing device 220, such as a server device 224. The server device 224, and/or a server automated assistant 226, can process the audio data to identify any actions requested by the user 208 via the spoken utterance 202. Identifiers for the actions can be provided, optionally with other data, as an input to the machine learning model in order to identify an order of execution for the actions. The machine learning model can be stored or otherwise accessible at the server device 224 and/or the client device 214.

In response to receiving an input, the machine learning model can be used to generate an output indicating one or more orders of execution for the actions. In some implementations, the machine learning model can be used to provide a single order of execution from which the automated assistant can rely upon in order to initialize performance of the requested actions. Alternatively, the machine learning model can be used to provide multiple orders of execution, and the automated assistant can select the order of execution that satisfies a particular criteria. For instance, the machine learning model can be used to provide an output that indicates one or more orders of execution for the actions, as well as one more corresponding properties of each respective order of execution. For instance, an order of execution provided based on the machine learning model can be provided with a value for total amount of execution time, total amount of latency, total memory usage, total CPU usage, and/or any other metric that can be associated with computational efficiency. The automated assistant can then select a particular order that satisfies particular criteria, such as least amount of execution time, lowest amount of latency, lowest amount of memory usage, least amount of CPU usage, and/or any other criteria or combination thereof.

When the automated assistant has selected an order of execution based on the machine learning model, or other operations discussed herein, the automated assistant can initialize performance of one or more actions. For instance, when the automated assistant has selected an order of execution of first providing the weather report, then setting the alarm, and then playing the show, the automated assistant can initialize an operation of retrieving the weather report via the network 228. When the weather report has been retrieved, a client device 214 can perform an operation of providing a natural language output 204 corresponding to the weather report. For instance, the natural language output corresponding to the weather report can be, "The weather for tomorrow is sunny, with a high of 75 degrees and a low of 66 degrees."

In some implementations, the automated assistant can cause the weather report to be provided by a third-party agent, such as a third party weather application or module accessible via another computing device and/or website. A third party can refer to an entity that provides an application, service, device, and/or any other product, and can be different from an entity that provided the automated assistant and/or an operating system of the client device 214. After the third party agent has provided the weather report to the automated assistant, the third party agent can provide an indication that one or more tasks assigned to the third party agent have been completed. In response to receiving the indication from the third party agent, the automated assistant can initialize performance of an action that is next in the order of execution of actions selected by the automated assistant.

In some implementations, a selected order of execution can correspond to, or indicate, an order that the automated assistant should complete the requested actions, rather than initialize the requested actions. For instance, although the order of actions requested in FIG. 2 by the user 208 are being completed according to a first order, sub tasks associated with each action can be completed in a different, second order. For example, a machine learning model can indicate the order of completion, and also provide an output indicating an order of subtasks to be performed. Therefore, in some implementations, the automated assistant can initialize a first action (e.g., providing the weather report) prioritized in an order of execution of actions, and simultaneously, or shortly thereafter, initialize performance of a subtask (e.g., downloading and/or caching show data) of a third action in the order of execution of actions. As an example, the order of execution for the actions can identify the weather report as a highest priority action to be completed, but can also designate a subtask or operation, such as downloading the show, to also be a higher priority than the majority of other subtasks or operations (e.g., providing a natural language output requesting when the alarm should be set, and confirming the setting of the alarm), despite the show playback action being last with respect to the priority for completing the actions. In other words, the automated assistant can initialize certain subtasks or operations that can mitigate overall latency and/or total estimated time of completion for a series of requested actions. Additionally, or alternatively, the automated assistant can delegate one or more subtasks or operations to one or more devices that were not the target device for the spoken utterance 202. For instance, the subtask of downloading the show can be performed as a background action 230 by the other device 210 concurrent to the automated assistant retrieving the weather report over the network 228 and/or providing the weather report via the client device 214.

Figure 3:
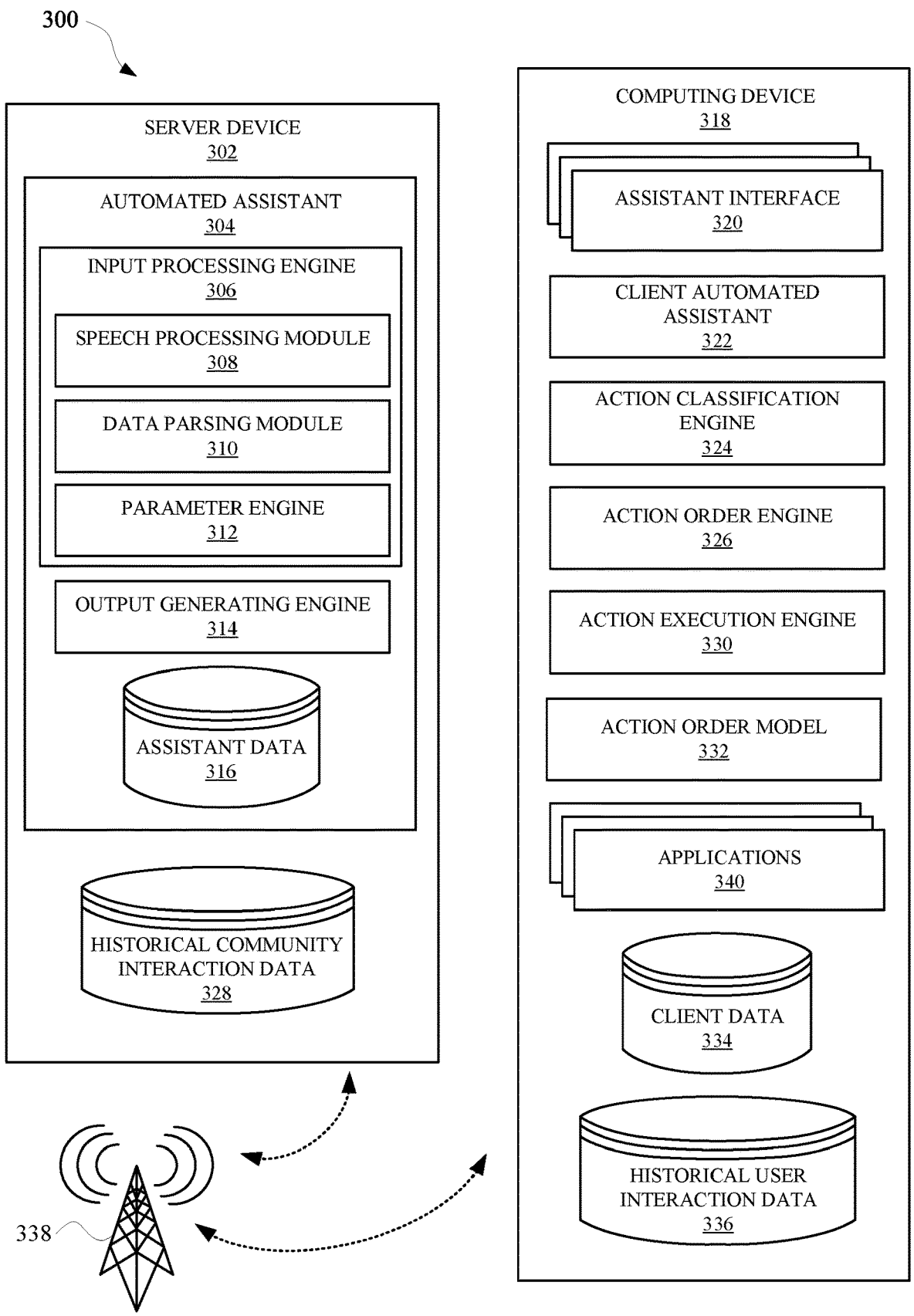
FIG. 3 illustrates a system for modifying an order of execution for a set of actions requested to be performed via an automated assistant in order to eliminate waste of processing and network resources.

FIG. 3 illustrates a system 300 for modifying an order of execution for a set of actions requested to be performed via an automated assistant 304 in order to eliminate waste of processing and network resources. The automated assistant 304 can operate as part of an assistant application that is provided at one or more computing devices, such as a computing device 318 and/or a server device 302. A user can interact with the automated assistant 304 via an assistant interface, which can be a microphone, a camera, a touch screen display, a user interface, and/or any other apparatus capable of providing an interface between a user and an application. For instance, a user can initialize the automated assistant 304 by providing a verbal, textual, or a graphical input to the assistant interface to cause the automated assistant 304 to perform a function (e.g., provide data, control a peripheral device, access an agent, generate an input and/or an output, etc.). The computing device 318 can include a display device, which can be a display panel that includes a touch interface for receiving touch inputs and/or gestures for allowing a user to control applications of the computing device 318 via the touch interface. In some implementations, computing device 318 can lack a display device, thereby providing an audible user interface output, without providing a graphical user interface output. Furthermore, the computing device 318 can provide a user interface, such as a microphone, for receiving spoken natural language inputs from a user. In some implementations, the computing device 318 can include a touch interface and can be void of a camera, but can optionally include one or more other sensors.

The computing device 318 and/or other computing devices 334 can be in communication with the server device 302 over a network 338, such as the internet. Additionally, the computing device 318 and the other computing devices 334 can be in communication with each other over a local area network (LAN), such as a Wi-Fi network. The computing device 318 can offload computational tasks to the server device 302 in order to conserve computational resources at the computing device 318. For instance, the server device 302 can host the automated assistant 304, and computing device 318 can transmit inputs received at one or more assistant interfaces 320 to the server device 302. However, in some implementations, the automated assistant 304 can be hosted at the computing device 318 as a client automated assistant 322.

In various implementations, all or less than all aspects of the automated assistant 304 can be implemented on the computing device 318. In some of those implementations, aspects of the automated assistant 304 are implemented via the client automated assistant 322 of the computing device 318 and interface with the server device 302 that implements other aspects of the automated assistant 304. The server device 302 can optionally serve a plurality of users and their associated assistant applications via multiple threads. In implementations where all or less than all aspects of the automated assistant 304 are implemented via a client automated assistant 322 at the computing device 318, the client automated assistant 322 can be an application that is separate from an operating system of the computing device 318 (e.g., installed "on top" of the operating system)—or can alternatively be implemented directly by the operating system of the computing device 318 (e.g., considered an application of, but integral with, the operating system).

In some implementations, the automated assistant 304 and/or the client automated assistant 322 can include an input processing engine 306, which can employ multiple different modules for processing inputs and/or outputs for the computing device 318 and/or the server device 302. For instance, the input processing engine 306 can include a speech processing module 308 that can process audio data received at an assistant interface 320 to identify the text embodied in the audio data. The audio data can be transmitted from, for example, the computing device 318 to the server device 302 in order to preserve computational resources at the computing device 318.

The process for converting the audio data to text can include a speech recognition algorithm, which can employ neural networks, word2vec algorithms, and/or statistical models for identifying groups of audio data corresponding to words or phrases. The text converted from the audio data can parsed by a data parsing module 310 and made available to the automated assistant as textual data that can be used to generate and/or identify command phrases from the user. In some implementations, output data provided by the data parsing module 310 can be provided to a parameter module 312 to determine whether the user provided an input that corresponds to a particular action and/or routine capable of being performed by the automated assistant 304 and/or an application or agent that is capable of being accessed by the automated assistant 304. For example, assistant data 316 can be stored at the server device 302 and/or the computing device 318, as client data 332, and can include data that defines one or more actions capable of being performed by the automated assistant 304 and/or client automated assistant 322, as well as parameters necessary to perform the actions. A user can specify one or more values for assigning to one or more parameters of an action to be performed by the automated assistant 304, at the direction of the automated assistant 304, and/or by a third-party agent that is accessible via the automated assistant 304. The third-party agent can be provided by a party that is different from another party that has provided the automated assistant 304.

In some implementations, the system 300 can include a server device 302 and/or a computing device 318 that includes one or more features for reordering sequences of requested actions set forth by a user in a spoken utterance. The spoken utterance, such as one in which the user has requested a series of actions be performed by automated assistant, can be received at an automated assistant interface 320 and converted into audio data. The audio data can be processed by the input processing engine 306, which can be provided at the server device 302 and/or the computing device 318. The audio data can be converted into text, and/or otherwise processed, to identify each action requested by the user. In some implementation, audio data that is based on the spoken utterance can be provided as input to a neural network model, which can provide an output indicative of the actions requested by the user, and/or an order for the actions.

When the actions have been identified, data characterizing the actions can be shared with, or otherwise available at the computing device 318, and can be processed by an action classification engine 324. The action classification engine can receive data characterizing an action, and determine, based on the data, a classification for the action. For instance, a request to play a TV series or a song can correspond to classification referred to as a continuous playback action. Alternatively, or additionally, a request for information from the internet, such as a weather report or economic news, can correspond to a classification referred to as a request for information action. Furthermore, or alternatively, a request to change a setting of a particular device can correspond to a classification referred to as a device setting classification. In some implementations, one or more different actions can be classified according to one or more different classifications, respectively, not limited to those classifications disclosed here in.

In some implementations, an action classification engine 324 can determine the classification for each action requested by the user via the spoken utterance. In some implementations, an action classification can be based on one or more determined execution characteristics of a particular action. For instance, an action that necessitates further dialog between the user and the automated assistant can be classified as a dialog initiating action for at least having a dialog session as an execution characteristic. Additionally, or alternatively, an action that necessitates determining and modifying settings of a local device can be classified as a request to change a device setting, at least based on the action having an execution characteristic of causing the automated assistant to transmit a request to the local device for modifying the device settings. Each classification can be communicated to an action order engine 326, which can receive data that characterizes the classification of actions requested by the user and generate an order for the actions based at least on the data. For instance, when the user requests a first action corresponding to continuous playback of music, and a second action corresponding to a request for information from the internet, the action classification engine 324 can determine that the request from the user includes a continuous playback action and a request for information action. These classifications can be provided to the action order engine 326, which can generate an order for the actions that prioritizes the second action, of providing the information from the internet, over providing the continuous playback of music.

In some implementations, the action order engine 326 can generate an order for a set of requested actions based on an action order model 332. The action order model 332 can be one or more neural network models trained based on historical user interaction data 336 and/or historical community interaction data 328, with prior permission from corresponding users. For instance, the historical user interaction data 336 can include data that characterizes interactions between the user and the automated assistant 304. Such interactions can include those in which the user provided a request for multiple actions to be performed and subsequently provided feedback to the automated assistant 304, and/or subsequently did not provide feedback to the automated assistant 304. The feedback can include subsequent spoken utterances in which the user commanded the automated assistant 304 to rearrange an order of execution for the multiple actions. For instance, the user may have previously provided a spoken utterance such as, "Assistant, play ambient noise and set an alarm for tomorrow." In response, the automated assistant 304 may have initialized playback of the ambient noise prior to initiating a dialogue for setting up the alarm, which may have not been preferential to the user. Therefore, the user may have provided feedback to the automated assistant 304 in the form of a spoken utterance such as, "No, set the alarm first and then play the ambient noise." Such feedback can be used to train the action order model 332, in order that subsequent similar requests can be modified according to user preferences learned over time with permission from the user.

Training can be based on client data 334, which can characterize operations of the computing device 318, a context of the computing device 318, and/or any other information that can be associated with the computing device 318. For instance, the client data 334 can characterize a status of one or more applications 340 of the computing device 318. In this way, the action order model 332 can learn preferences of the user based on feedback from the user, as well as any other information that may have been relevant when the user provided the feedback. In some implementations, an order of actions generated by the action order model 332 can be based on a context of the computing device 318. For instance, GPS data provided by the computing device 318 can indicate that the user has just arrived home, and other data can indicate that, subsequently, the user provided a spoken utterance such as, "Assistant, play my lounge playlist and set my alarm." In response, rather than initiating a dialogue session between the user and the automated assistant in order to set a wake alarm, the automated assistant can initialize playback of the lounge music playlist and, in the background, turn on a home security alarm at the home of the user. This resulting order of actions can be different, if the user is determined to have been home for at least a threshold amount of time, which can be determined by the action order model 332, and can be based on a window of time in which the user typically lies down in bed to go to sleep. For example, if the user is determined to be home and in their room within a window of time that the user typically lies down in bed to go to sleep, and the user provides the spoken utterance, "Assistant, play my lounge music playlist and set my alarm," the automated assistant can initialize a dialogue for setting a wake alarm, and then upon completion of setting to wake alarm, initialize playback of the lounge music playlist.

In some implementations, one or more action order models 332 can be trained according to historical user interaction data 336, which can correspond to a user of the computing device 318, and according to historical community interaction data 328, which can correspond to one or more other users of an automated assistant. The action order model 332 can be trained and configured such that the action order model 332 can receive, as inputs, classifications of actions requested by the user according to a first order, and provide, as output, a second order for the actions requested by the user. In some implementations, the historical community interaction data 328 can characterize interactions between users and their respective automated assistants, and can specifically identify those interactions in which the users requested different classifications of actions be performed. Alternatively, or additionally, the historical community interaction data 328 can also characterize conditional statements made by users when requesting that certain classifications of actions be performed. In this way, the action order model 332 can recognize trends in user preferences for orders of execution for particular classifications of actions, at least compared to other orders of execution for the particular classifications of actions.

For example, training of the action order model 332 can reflect a preference of a majority of users to have a request for information action be completed before a continuous playback action. The preference of the majority of users can be identified by processing the historical community interaction data 328 and determining that a majority of time that the users requested a request for information action and a continuous playback action in the same spoken utterance, the majority of users also included the conditional statement, "and then." For instance, a majority of users, or at least multiple users, may have provided a spoken utterance such as, "Assistant, tell me the weather for today and then play my morning playlist." Because multiple users provided the conditional statement with these two different classifications of actions, this conditional statement can influence the training of the action order model 332. As a result, when the user of the computing device 318 provides a similar spoken utterance requesting each of the two different classifications of actions be performed, the automated assistant 304 can use the action order model 332 to ensure that the order of execution of the actions is performed according to the preferences of users corresponding to the historical community interaction data 328. However, should the user provide a conditional statement within a spoken utterance, the conditional statement can take priority as a rule for ordering the execution of actions over an order of actions determined from the action order model 332.

In some implementations, an order of actions can be determined based on a number of available devices accessible to the automated assistant 304. For instance, the action order model 332 can receive, as input, identifiers for computing devices that are: connected to a local network with the computing device 318, accessible via the client automated assistant 322, and/or otherwise are associated with the computing device 318. Because some actions requested by user can be performed at one or more different computer devices, the automated assistant 304 can delegate certain actions to particular computer devices in a particular order based on which computing devices are available. For example, a user can have a smart thermostat, smart light bulbs, and an automated assistant device within their home. Furthermore, the user can provide a spoken utterance that includes a request to perform multiple actions, such as, for example, "Assistant, turn up the thermostat, turn down the lights, play my night time playlist, and order a food delivery."

Audio data corresponding to the spoken utterance can be processed to determine classifications for the aforementioned actions that have been requested by the user. Identifiers for the classifications, as well as identifiers for the smart thermostat, smart light bulbs, and the assistant device can be provided as input to the action order model 332. The action order model 332 can provide, as output, a determined order of actions for the automated assistant 304 to follow, and/or one or more order of actions for each particular device in the home to follow. For instance, the automated assistant 304 can delegate the changing of the lights to the smart light bulbs, the modification to the temperature of the home to the thermostat, and provide an order of execution for the remaining actions to the automated assistant device. Specifically, the order of actions for the automated assistant device can prioritize ordering the food delivery over playing the night time playlist.

This order of actions for the automated assistant device can be based on historical user interaction data 336, historical community interaction data 328, and/or classification preferences for the automated assistant 304. For example, the automated assistant 304 can prioritize dialogue initiating actions, such as ordering food delivery, over continuous playback actions, such as playing a nighttime playlist. As a result, despite the automated assistant 304 having an order of actions set for the automated assistant device, the other requested actions would be simultaneously performed at the other respective devices. In other words, a first action in the order of actions set for the automated assistant device would be performed at the same time as an action set for the smart light bulbs and an action set for the thermostat. In this way, the automated assistant 304 and/or the action order model 332 can generate action orders for multiple different devices to concurrently execute.

Figure 4:
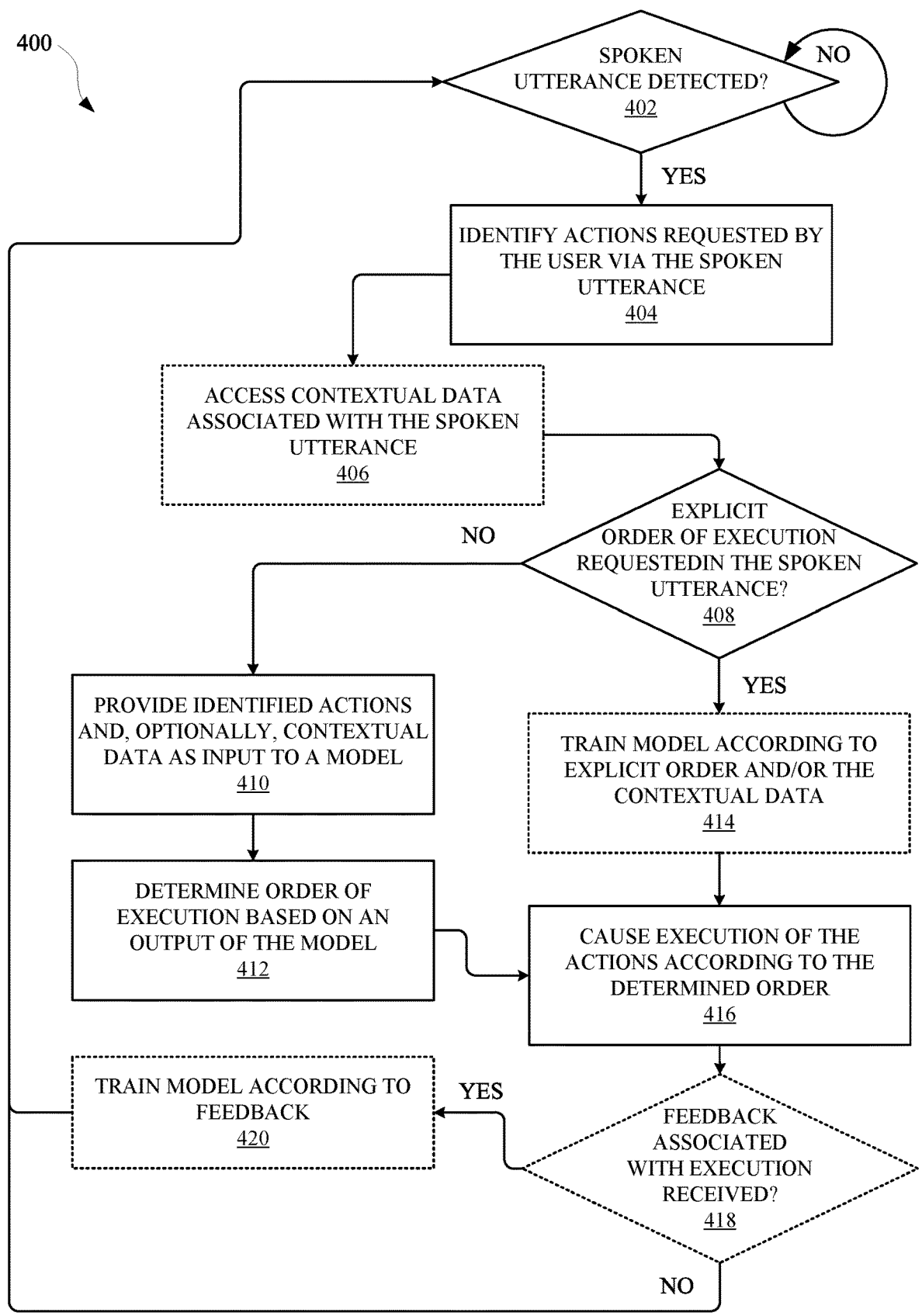
FIG. 4 illustrates a method for determining an order of actions for an automated assistant to perform, at least according to processing using a trained machine learning model.

FIG. 4 illustrates a method 400 for determining an order of actions for an automated assistant to perform, at least according to a trained machine learning model. The method 400 can be performed by one or more computing devices, applications, and/or any other apparatus or module capable of interacting with an automated assistant. The method 400 can include an operation 402 of determining whether a spoken utterance has been detected. The spoken utterance can be provided by a user to an automated assistant interface of the computing device, and the spoken utterance can be converted into data that is transferable between devices. For instance, when the automated assistant interface is as a microphone, the spoken utterance can be converted into audio data that is then transmitted to a server device for further processing. In some implementations, a determination of whether a spoken utterance was provided can include determining whether the user intended to invoke the automated assistant for providing a response or otherwise performing a particular action. The operation 402 can be determined periodically, and, when a spoken utterance is detected, the method 400 can proceed to operation 404.

The operation 404 can include identifying actions requested by the user via the spoken utterance. The user can cause the spoken utterance to embody one or more requests for one or more actions to be performed by the automated assistant. When data corresponding to the spoken utterance is processed, the data can be converted to text, parsed, and further processed to determine any actions that the user is requesting be performed. In some implementations, data generated based on the spoken utterance can be processed, using a machine learning model, to generate output data then identifies one or more actions requested by the user via the spoken utterance. The machine learning model can be trained using data that has been generated since the user has been interacting with the automated assistant and/or data generated by a provider of the automated assistant.

The method 400 can further include an optional operation 406 of accessing contextual data associated with the spoken utterance. The contextual data can be based on operations of one or more computing devices associated with the user, the automated assistant, and/or any other device(s) accessible to the user. For instance, the contextual data can identify an operating status of one or more devices that are accessible to the automated assistant. Alternatively, or additionally, the contextual data can characterize environmental characteristics associated with an environment of the user, such as when and where the user provided the spoken utterance. Alternatively, or additionally, the contextual data can characterize a schedule of the user, occupancy of location where the user is, a time of day when the user provided the spoken utterance, one or more previous spoken utterances provided by the user or another person, scheduled actions to be performed by one or more devices when the user provided the spoken utterance, and/or any other information that can be associated with a context of a user.

The method 400 can further include an operation 408 of determining whether an explicit order for the actions was requested in the spoken utterance. An explicit order for the actions can be requested by a user who provides explicit statements indicating an order for the actions to be executed. For instance, within a spoken utterance provided by the user, the user can request that a first action be executed and then a second action be executed. The conditional statement "and then" can be interpreted as an explicit request for contingency of performance of the second action to be based on completion of the first action, and/or at least initialization of the first action. If the user has not provided an explicit order for the requested actions, the method 400 can proceed to operation 410.

The operation 410 can include providing data, characterizing the identified actions and, optionally, contextual data, as input to a trained machine learning model. The input can be processed using the trained machine learning model to generate output that characterizes an order for an execution of the actions requested by the user in the spoken utterance. In other words, although the actions may be set forth in the spoken utterance in a first order, the output, generated using the trained machine learning model, can re-arrange the order so that a second order of execution is performed at the direction of the automated assistant. Therefore, in response to using the trained machine learning model to process the input that characterizes the identified actions and, optionally, the contextual data, output data can be generated that characterizes an order for executing the actions.

The method 400 can further include an operation 412 of determining the order of execution for the actions based on output generated using the trained machine learning model. The order of execution determined using the trained machine learning model can be generated in order to reduce latency and therefore eliminate waste of computational resources, such as memory and processing bandwidth. Furthermore, by reducing latency between receiving the spoken utterance and executing the actions, network bandwidth can be preserved, as actions depending on responsiveness of networks can be prioritized according to availability of network resources. For example, based on the training of the machine learning model, the machine learning model can be trained to rank certain actions that exhibit the most network latency lower than those action that have historically been performed with the least amount of network latency. Such training of the machine learning model can be based on data characterizing interactions between the user, who provided the spoken utterance, and the automated assistant. Additionally, or alternatively, the training of the machine learning model can be based on data characterizing interactions between one or more other users and their own respective automated assistants. In this way, the trained machine learning model can indicate whether certain actions that rely on third party providers or third party agents have resulted in more latency or less latency when other users have requested such actions be executed.

In some implementations, the method 400 can include an optional operation 414 of training a machine learning model according to, or otherwise based on, the explicit order provided by the user and/or optionally any contextual data that was used to determine the order. In other words, when the user has provided an explicit order for the actions, that explicit order can be characterized as data that is used when further training the machine learning model.

The method 400 can further include an operation 416 of causing execution of the actions according to the determined order. For instance, the automated assistant can initialize a web query, when the first action indicated in the order is a request for information. Alternatively, the automated assistant can cause a third party device to adjust an operational setting when the first action in the determined order includes a change to a device setting. In some implementations, when the order is explicitly provided by the user, the method 400 can proceed from the operation 408 and/or the operation 414 to the operation 416. In this way, the automated assistant can rely on an explicit order when the user has provided the explicit order, and a separately determined order, based on output generated using the machine learning model, when the user has not provided an explicit order for the requested actions.

In some implementations, the method 400 include an operation 418 of determining whether feedback has been received regarding the order of execution of the actions. Feedback can include one or more inputs provided by the user before, during, and/or after execution of the actions. For instance, when the automated assistant has completed executing all the actions requested by the user according to a particular order, the user can provide a spoken utterance such as, "Assistant, next time set my alarm first." The aforementioned spoken utterance can be processed by the automated assistant, determined to be feedback, and embodied in training data, which can be utilized in training the machine learning model. In some implementations, feedback can be provided by the user during execution of the action. For instance, the user can provide a spoken utterance such as, "Assistant, wait to play my music until I have finished ordering food." In response, the automated assistant can modify any ongoing and/or pending actions according to the feedback provided by the user. Furthermore, the feedback can be characterized by data which can be provided as training data to further train the machine learning model, in order to further adapt the machine learning model to provide more suitable orders for sequences of requested actions.

When feedback is provided by the user, the method 400 can proceed to an operation 420 of training the machine learning model according to the feedback. When feedback is not received from the user, at least with respect to the execution of the actions, the method 400 can proceed back to the operation 402 for detecting whether any other spoken utterances have been received by the automated assistant.

Figure 5:
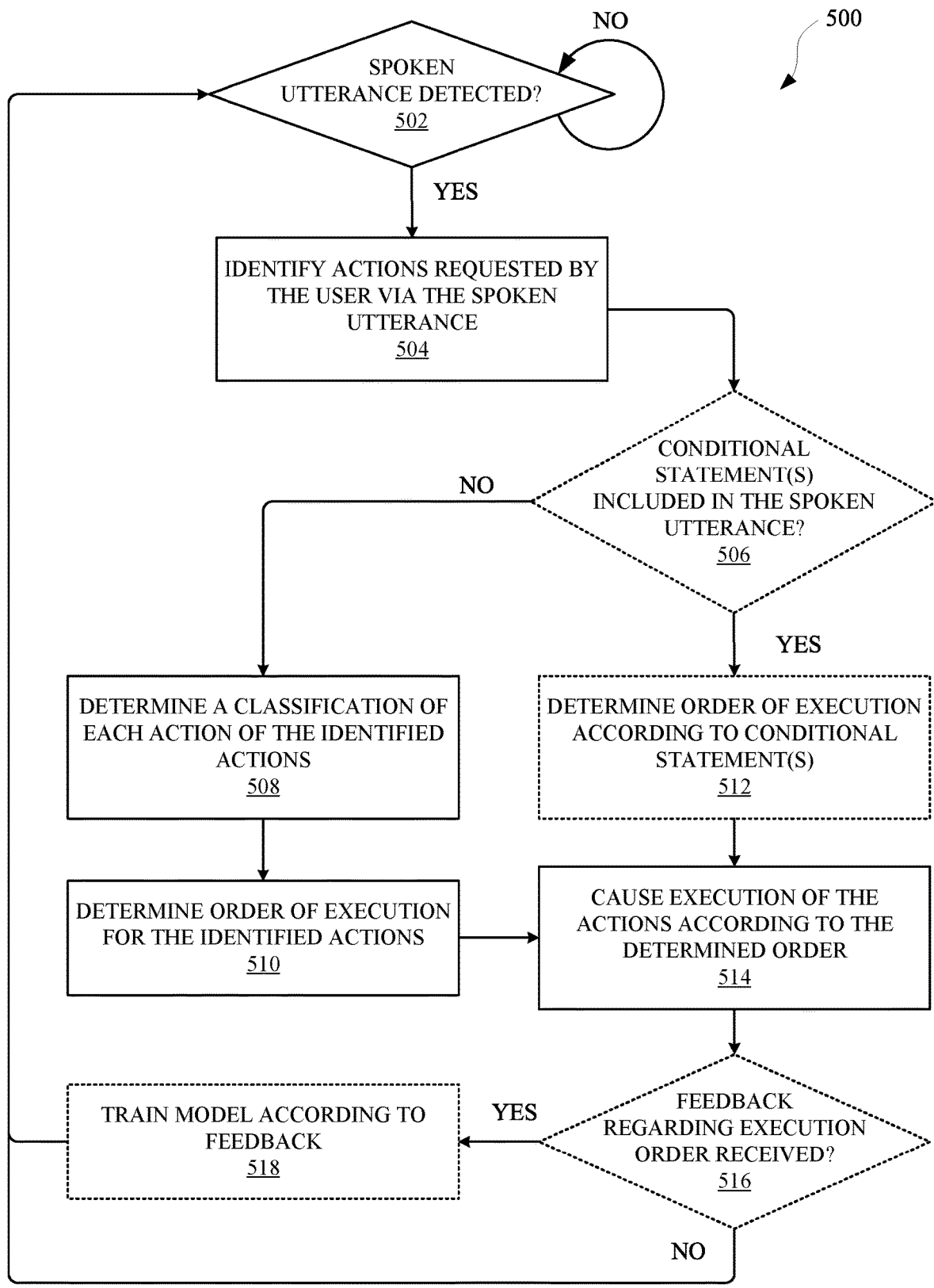
FIG. 5 illustrates a method for arranging a sequence of actions according to a classification of the actions.

FIG. 5 illustrates a method 500 for arranging a sequence of actions, requested to be performed by an automated assistant, according to a classification of the actions. The method 500 can be performed by one or more computing devices, applications, and/or any other apparatus or module capable of interacting with an automated assistant. The method 500 can include an operation 502 of determining whether a spoken utterance has been detected. The spoken utterance can be detected at computing device that provides access to an automated assistant, and/or a server device that is in communication with a computing device from which an automated assistant is accessible. The spoken utterance can be provided by user to an automated assistant interface, such as a microphone, and can include natural language such as, "Assistant, order food delivery, turn down the lights, and tell me what is on TV tonight."

In response to determining that a spoken utterance has been detected, the method 500 can proceed to an operation 504 of identifying one or more actions requested by the user via the spoken utterance. Specifically, audio data that embodies, and/or otherwise characterizes, the spoken utterance can be processed in order to determine the natural language content of the spoken utterance. The natural language content can be parsed and further processed to identify one or more actions requested by the user via the spoken utterance. For instance, when audio data corresponding to the aforementioned spoken utterance is processed, a food delivery action, a light settings action, and an action requesting a television schedule can be identified.

In some implementations, the method 500 can include an optionally operation 506 of determining whether a conditional statement was included in the spoken utterance. A conditional statement can be a phrase or word provided by the user indicating that one or more of the requested actions are conditioned upon something else occurring. For instance, the user can provide a phrase describing a temporal contingency of an action, such as a contingency that relies on completion of another action. Alternatively, or additionally, the user can provide a word or phrase that describes a condition that can be satisfied based on a context of the user, status of one or more devices, application data associated with the user, and/or any other data that can be relevant to an action being performed by an automated assistant.

In some implementations, when the spoken utterance does or does not include one or more conditional statements, the method 500 can proceed to an operation 508. The operation 508 can include determining a classification of each action of the identified actions. The classifications can be determined based on an output of a text processing module, which can provide textual data that reflects the natural language context of the spoken utterance. Alternatively, or additionally, audio data or other data that is based the spoken utterance can be provided to a trained machine learning model, and an output of the trained machine learning model can be used to determine each classification of each action requested via the spoken utterance. When the classifications have been identified, the method 500 can proceed to the operation 510.

The operation 510 can include determining an order of execution for the identified actions. Determining the order of execution for the identified actions can be based at least in part on a classification that each action of the identified actions. For instance, an action of multiple actions requested by the user in a spoken utterance can be a request for continuous media playback. Such a classification for an action can have a lower priority relative to an action for providing information (e.g., providing a weather report). Alternatively, or additionally, an action classified as a request to change a device setting can have a higher priority relative to a continuous media playback classification, but have a lower priority relative to a request for info classification. In some implementations, determining the order of execution for the identified actions can be performed at least based on an output of a trained machine learning model. The trained machine learning model can be adapted to provide an output that is indicative of a suitable order of operations. The trained machine learning model can be trained using data that characterizes interactions between the user and the automated assistant. Alternatively, or additionally, the trained machine learning model can be trained using data that characterizes interactions between multiple different users not directly related to the user that provided the spoken utterance.

The method 500 further include an operation 514 of causing execution of the actions according to the determined order. The determined order can be explicitly provided by the user, at least when the user is determined to have provided conditional statements according to operation 512. Alternatively, or additionally, the order of execution for the identified actions can be based on an output of one or more machine learning models, contextual data characterizing a context of the user, and/or any other data from which a priority of an action in a series of actions can be based.

In some implementations, the method 500 can optionally include an operation 516 determining whether feedback regarding the execution order has been received. The feedback, as discussed herein, can based on another spoken utterance provided by the user before, during, and/or after execution of the identified actions. The feedback, for example, can characterize a preference of the user for a particular classification of action to have a priority that is higher than another classification of an action. When feedback is determined to have been received before, during, and/or after execution of the identified actions, the method 500 can proceeded to an operation 518 of training the machine learning model according to the feedback. In other words, the feedback can be received from the user and processed in order to generate training data, which can be provided to a machine learning model, in order to update the machine learning model according to preferences of one or more users. In this way, computational resources can be preserved, as the user would not have to repeatedly provide the same feedback. Rather, preferences related to the order of execution can be learned over time so that feedback from the user would need to be provided less overtime. Certain computational resources, such as network bandwidth and memory, can be preserved when a computing device is processing spoken utterances less frequently. Whether feedback has been provided by a user or not, the method 500 can proceed back to the operation 502 of determining whether a spoken utterance has been detected. In this way, the method 500 allows for the continual learning of user preferences while also eliminating wasteful processing and unnecessary network transmissions that can occur when a user must repeatedly correct there request or otherwise provide feedback to the automated assistant regarding their previous requests.

Figure 6:
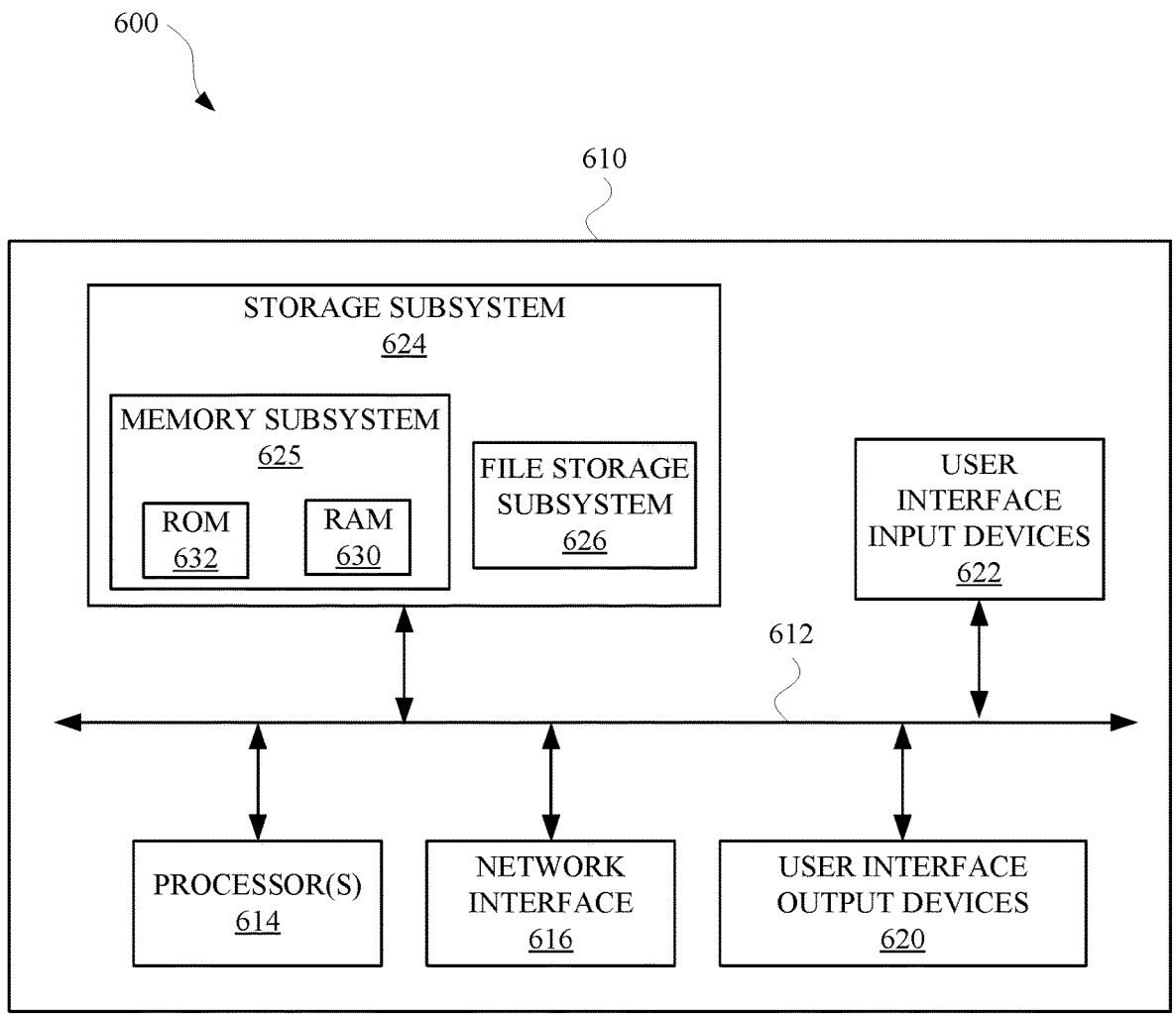
FIG. 6 is a block diagram of an example computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 400, method 500, and/or to implement one or more of client device 124, client automated assistant 126, server device 120, server automated assistant 122, client device 214, client automated assistant 216, server device 224, server automated assistant 226, server device 302, computing device 318, automated assistant 304, client automated assistant 322, action classification engine 324, action order engine 326, action execution engine 330, and/or action order model 332.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

We claim:

1. A method implemented by one or more processors, the method comprising:
   determining that a user has provided a spoken utterance that includes requests for an automated assistant to perform multiple actions that include a first type of action and a second type of action, wherein the automated assistant is accessible to the user via an automated assistant interface of a computing device;
   generating, in response to the user providing the spoken utterance, an estimated delay for the first type of action when the second type of action is prioritized over the first type of action during execution of the multiple actions;

determining, based on the estimated delay, whether the estimated delay for the first type of action satisfies a threshold, wherein, when the estimated delay for the first type of action satisfies the threshold, execution of the first type of action is prioritized over the second type of action;

generating, based on whether the estimated delay satisfies the threshold, a preferred order of execution for the multiple actions requested by the user; and causing the automated assistant to initialize performance of the multiple actions according to the preferred order of execution.

2. The method of claim 1, further comprising:

determining an action classification for each action of the multiple actions requested by the user, wherein the automated assistant is configured to prioritize at least one particular classification of actions over at least one other classification of actions.

3. The method of claim 1, wherein the first type of action includes a dialog initiating action and the second type of action includes a media playback action.

4. The method of claim 3, wherein the media playback action is configured to be at least partially performed at a separate computing device, and the method further comprises:

when the dialog initiating action is prioritized over the media playback action:

causing the dialog initiating action to be initialized at the computing device simultaneous to causing the separate device to initialize an application for executing the media playback action.

5. The method of claim 4, further comprising:

when the media playback action is prioritized over the dialog initiating action:

causing the automated assistant to provide a natural language output corresponding to dialog in furtherance of completing the dialog initiating action, and when the dialog initiating action is completed:

causing the automated assistant to initialize performance of the media playback action at the computing device or the separate computing device.

6. The method of claim 3, wherein the dialog initiating action, when executed, includes initializing a dialog session between the user and the automated assistant in order for the user to identify a value to be assigned to a parameter in furtherance of completing the dialog initiating action.

7. The method of claim 3, wherein the media playback action, when executed, includes initializing playback of media that is accessible via one or more files, and the estimated delay is based on a total of file lengths for the one or more files.

8. A system, comprising:

one or more processors; and memory configured to store instructions that, when executed by the one or more processors, cause the one or more processors to perform operations that include:

determining that a user has provided a spoken utterance that includes requests for an automated assistant to perform multiple actions that include a first type of action and a second type of action, wherein the automated assistant is accessible to the user via an automated assistant interface of a computing device;

generating, in response to the user providing the spoken utterance, an estimated delay for the first type of action when the second type of action is prioritized over the first type of action during execution of the multiple actions;

determining, based on the estimated delay, whether the estimated delay for the first type of action satisfies a threshold, wherein, when the estimated delay for the first type of action satisfies the threshold, execution of the first type of action is prioritized over the second type of action;

generating, based on whether the estimated delay satisfies the threshold, a preferred order of execution for the multiple actions requested by the user; and causing the automated assistant to initialize performance of the multiple actions according to the preferred order of execution.

9. The system of claim 8, wherein the operations further include:

determining an action classification for each action of the multiple actions requested by the user, wherein the automated assistant is configured to prioritize at least one particular classification of actions over at least one other classification of actions.

10. The system of claim 8, wherein the first type of action includes a dialog initiating action and the second type of action includes a media playback action.

11. The system of claim 10, wherein the media playback action is configured to be at least partially performed at a separate computing device, and wherein the operations further include:

when the dialog initiating action is prioritized over the media playback action:

causing the dialog initiating action to be initialized at the computing device simultaneous to causing the separate device to initialize an application for executing the media playback action.

12. The system of claim 11, wherein the operations further include:

when the media playback action is prioritized over the dialog initiating action:

causing the automated assistant to provide a natural language output corresponding to dialog in furtherance of completing the dialog initiating action, and when the dialog initiating action is completed:

causing the automated assistant to initialize performance of the media playback action at the computing device or the separate computing device.

13. The system of claim 10, wherein the dialog initiating action, when executed, includes initializing a dialog session between the user and the automated assistant in order for the user to identify a value to be assigned to a parameter in furtherance of completing the dialog initiating action.

14. The system of claim 10, wherein the media playback action, when executed, includes initializing playback of media that is accessible via one or more files, and the estimated delay is based on a total of file lengths for the one or more files.

* * * * *